US011051237B2

(12) United States Patent
Taskin et al.

(10) Patent No.: US 11,051,237 B2
(45) Date of Patent: Jun. 29, 2021

(54) SYSTEM AND METHOD FOR MINIMIZING MANAGEMENT FRAME OVERHEAD IN WIRELESS NETWORKS

(71) Applicant: Airties Kablosuz Iletisim Sanayi Ve Dis Ticaret A.S., Istanbul (TR)

(72) Inventors: Metin Ismail Taskin, Istanbul (TR); Muharrem Sarper Gokturk, Istanbul (TR)

(73) Assignee: AIRTIES KABLOSUZ ILETISIM SANAYI VE DIS TICARET A.S., Istanbul (TR)

( * ) Notice: Subject to any disclaimer, the term of this patent is extended or adjusted under 35 U.S.C. 154(b) by 0 days.

(21) Appl. No.: 16/610,349

(22) PCT Filed: May 2, 2018

(86) PCT No.: PCT/IB2018/000560
§ 371 (c)(1),
(2) Date: Nov. 1, 2019

(87) PCT Pub. No.: WO2018/203133
PCT Pub. Date: Nov. 8, 2018

(65) Prior Publication Data
US 2020/0145908 A1    May 7, 2020

Related U.S. Application Data

(60) Provisional application No. 62/500,745, filed on May 3, 2017.

(51) Int. Cl.
*H04W 48/14* (2009.01)
*H04B 17/318* (2015.01)
(Continued)

(52) U.S. Cl.
CPC .......... *H04W 48/14* (2013.01); *H04B 17/318* (2015.01); *H04W 8/005* (2013.01); *H04W 84/12* (2013.01)

(58) Field of Classification Search
None
See application file for complete search history.

(56) References Cited

U.S. PATENT DOCUMENTS

| 10,206,166 B2 | 2/2019 | Karaca et al. | |
| 2012/0243474 A1* | 9/2012 | Iyer | H04L 63/1466 370/328 |

(Continued)

FOREIGN PATENT DOCUMENTS

| WO | 2015/197653 | 12/2015 |
| WO | 2016/092121 | 6/2016 |

OTHER PUBLICATIONS

Hsieh, "Response Considerations in Active Scanning," IEEE 11-12/1052r2 (Sep. 2012).

(Continued)

*Primary Examiner* — Jason E Mattis
*Assistant Examiner* — Hong Shao
(74) *Attorney, Agent, or Firm* — Volpe Koenig (57) ABSTRACT

Methods, systems, and apparatuses are described herein for reducing overhead in a probe request and probe response message exchange used in wireless networks. An access point (AP) may receive a first signal from a station (STA). The first signal may include a probe request message that includes an identification of the STA. The AP may determine that the STA is not currently associated with the AP and has not been associated with the AP within a predetermined time using a stored STA information table. The AP may generate a probe response message upon determining that a received signal strength indicator (RSSI) of the first signal is above a predetermined threshold. The AP may then transmit a sec- (Continued)

ond signal to the STA. The second signal may include the probe response message.

18 Claims, 8 Drawing Sheets

(51) Int. Cl.
*H04W 8/00* (2009.01)
*H04W 84/12* (2009.01)

(56) References Cited

U.S. PATENT DOCUMENTS

| | | |
|---|---|---|
| 2015/0003404 A1 | 1/2015 | Gokturk et al. |
| 2015/0304942 A1 | 10/2015 | Wentink |
| 2016/0309537 A1* | 10/2016 | Hart ................ H04W 76/18 |
| 2016/0373984 A1* | 12/2016 | Hara ................ H04W 36/0083 |
| 2017/0273012 A1* | 9/2017 | Zhang ................ H04W 48/16 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

* cited by examiner

SYSTEM AND METHOD FOR MINIMIZING MANAGEMENT FRAME OVERHEAD IN WIRELESS NETWORKS

CROSS REFERENCE TO RELATED APPLICATIONS

This application claims the benefit of U.S. Provisional Application No. 62/500,745 filed on May 3, 2017, the contents of which is hereby incorporated by reference.

BACKGROUND

IEEE 802.11 wireless local area networks (WLANs, also referred to herein as Wi-Fi) are typically multiple access networks. User devices may access the network via a randomized Medium Access Control (MAC) protocol, namely the Carrier Sense Multiple Access with Collision Avoidance (CSMA/CA) protocol, and the enhanced distributed channel access (EDCA) scheme according to a distributed coordination function (DCF). The specific MAC protocol employed by Wi-Fi networks is standardized in the IEEE 802.11 protocol.

SUMMARY

Methods, systems, and apparatuses are described herein for reducing overhead in a probe request and probe response message exchange used in wireless networks. An access point (AP) may receive a first signal from a station (STA). The first signal may include a probe request message that includes an identification of the STA. The AP may determine that the STA is not currently associated with the AP and has not been associated with the AP within a predetermined time using a stored STA information table. The AP may generate a probe response message upon determining that a received signal strength indicator (RSSI) of the first signal is above a predetermined threshold. The AP may then transmit a second signal to the STA. The second signal may include the probe response message.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Both mobile wireless devices and fixed wireless devices may employ one or more wireless ("Wi-Fi") chips to access the Internet through a Wireless Local Area Network (WLAN). With the introduction of Voice over Wi-Fi (Vo-WiFi), even telephone calls are being carried over Wi-Fi networks. Although the number of devices using Wi-Fi is increasing at an exponential pace, the available bandwidth allocated for Wi-Fi communication, namely the 2.4 GHz band and the 5 GHz band, has remained the same. In an effort to keep up with the increasing demand for Wi-Fi bandwidth, new IEEE 802.11 protocols with additional physical layer capabilities are being developed and introduced.

Whereas the physical layer and the data link control layer of the protocol has evolved significantly since the protocol's introduction (e.g., the protocols IEEE 802.11 a/b/g/n/ac/ax), the basic operation of the MAC layer has not changed much. As the number of Wi-Fi users in the same vicinity and in the same channel increases, airtime overhead created by the management frames may become so significant that the overall system performance (e.g., in terms of throughput, delay) may be degraded dramatically.

The following description includes methods, systems, and apparatuses to minimize management frame overhead in Wi-Fi networks. The examples described herein may be applied in any wireless network by a person skilled in the art.

Figure 1:
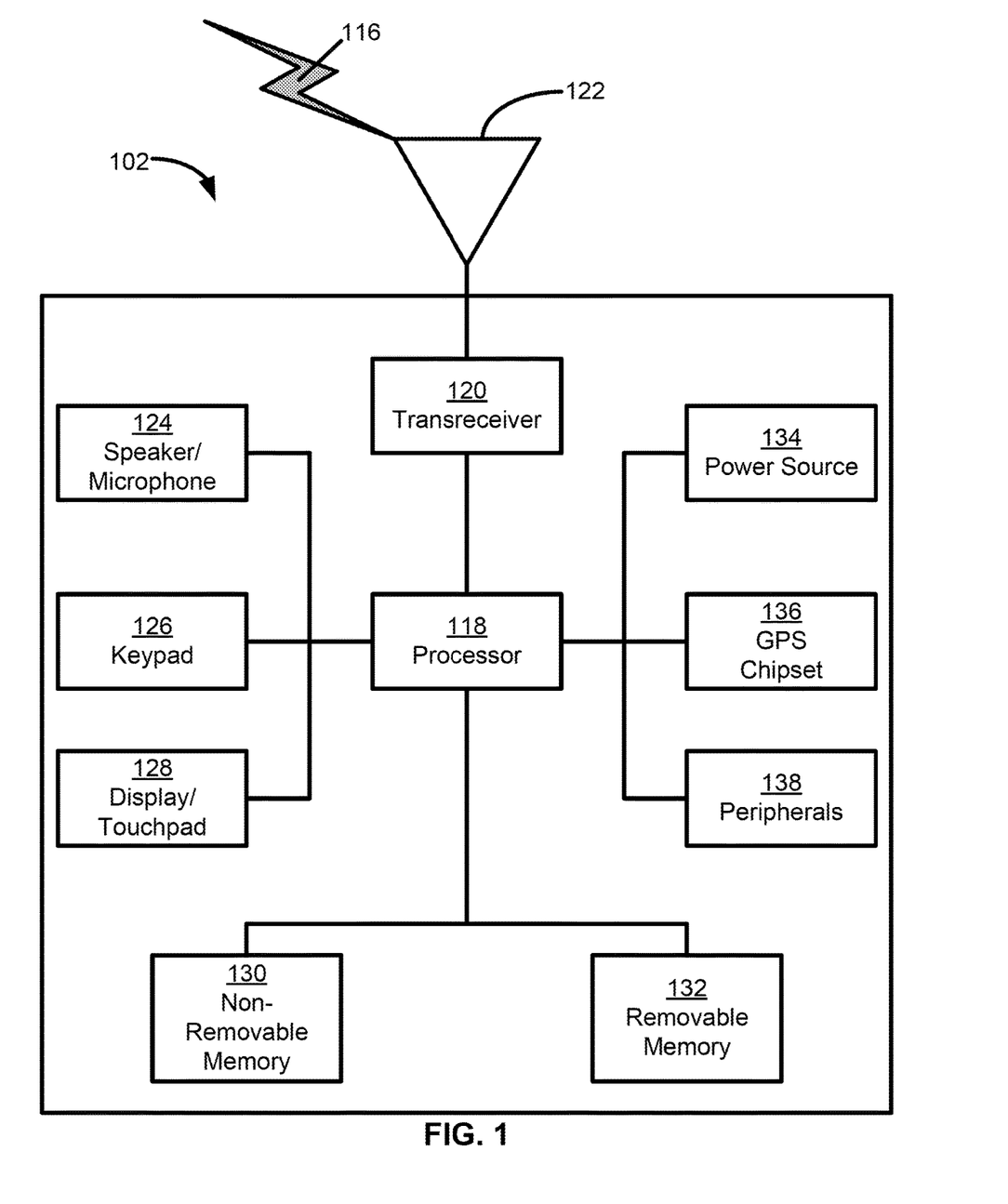
FIG. 1 is a diagram illustrating components of a communication device.

Referring now to FIG. 1, a diagram illustrating components of a communication device 100 is shown. The communication device 100 may be a station (STA) or may be an access point (AP) as described in further detail below. The communication device 100 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It should be noted that the STA and the AP described below may include any sub-combination of the foregoing elements while remaining consistent with the description.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the communication device 100 to operate in a wireless environment. The processor 118 may be coupled to the transceiver 120, which may be coupled to the transmit/receive element 122. While FIG. 1 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from other communication devices over an air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted as a single element, the communication device 100 may include any number of transmit/receive elements 122. More specifically, communication device 100 may employ MIMO technology. In an example, the communication device 100 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the communication device 100 may have multi-mode capabilities. Thus, the transceiver 120 may include multiple transceivers for enabling the communication device 100 to communicate via multiple air interfaces 116.

The processor 118 of the communication device 100 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the communication device 100, such as on a server or a home computer (not shown).

The processor 118 may receive power from the power source 134, and may be configured to distribute and/or control the power to the other components in the communication device 100. The power source 134 may be any suitable device for powering the communication device 100. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of communication device 100. In addition to, or in lieu of, the information from the GPS chipset 136, the communication device 100 may receive location information over the air interface 116 from a base station (e.g., base stations 114a, 114b) and/or determine its location based on the timing of the signals being received from two or more nearby base stations. It will be appreciated that the communication device 100 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The communication device 100 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the communication device 100 may include a half-duplex radio for which transmission and reception of some or all of the signals (e.g., associated with particular subframes for either the uplink (e.g., for transmission) or the downlink (e.g., for reception)).

A source of management overhead may be a probe request and probe response message exchange that occurs between a STA and one or more APs. The probe request may be a management frame that a STA may make use of to gather information about the APs in its vicinity when it is in Active Scanning mode. The STA may send a probe request message to a broadcast address, meaning that the message is intended for multiple recipients. The probe request may include identifying information about the STA, such as, for example, a Medium Access Control (MAC) address. The one or more APs that receive the probe request message may respond to the message by sending a probe response message. The probe response message may include information about the AP's capabilities, such as channel capabilities, supported IEEE 802.11 protocols, supported bandwidths, supported number of spatial streams, and various other physical layer capabilities. Probe response frames may include the same content as a beacon frame. Accordingly, the STA may be provided with the technical capabilities supported by the AP before it initiates association with the AP. The probe response message may be sent in unicast mode. In other words, the probe response frames may be intended only for one receiver STA (i.e., the transmitter of the probe request frame).

Because the probe request and probe response message exchange occurs in broadcast and unicast mode, respectively, a STA that sends a probe request message may trigger a probe response transmission by all the APs within the transmission range of the STA. For example, if there are four APs within the range of the STA, the probe request may trigger four probe response messages.

According to the IEEE 802.11 standards, broadcast messages may be transmitted using a basic rate, which is one of the possible slowest transmission rates available in the standards. It should be noted that slow transmissions occupy the wireless medium longer than fast transmissions. Accordingly, as the number of probe requests in the wireless medium increases, a considerable amount of airtime may be consumed by these frames.

Figure 2:
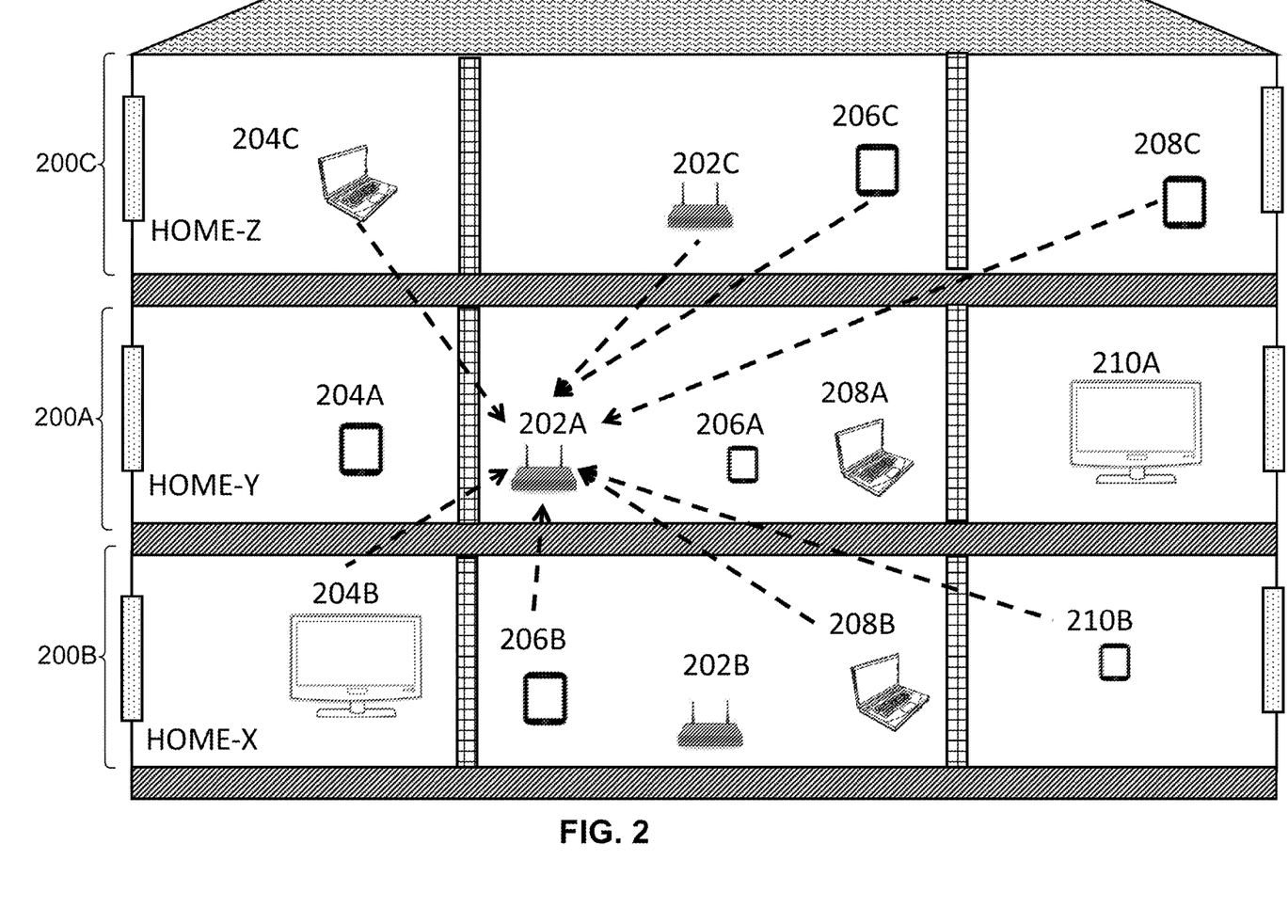
FIG. 2 is a diagram illustrating a first wireless network having an access point (AP) and one or more stations (STAs)

Referring now to FIG. 2, a diagram illustrating a first wireless network 200A having an AP 202A and one or more STAs is shown. The one or more STAs described below may include any combination of internet-connected devices, such as mobile devices, computers, televisions, wearables, smart devices, thermostats, cameras, and Internet of Things (IoT) devices. The wireless network 200A may include a first STA 204A, a second STA 206A, a third STA 208A, and a fourth STA 210A. As shown in FIG. 2, the wireless network 200A may be in a proximity to one or more neighbor wireless networks. For example, the wireless network 200A may be in proximity with a second wireless network 200B and a third wireless network 200C. The second wireless network 200B may have its own AP 202B and one or more STAs such as a first STA 204B, a second STA 206B, a third STA 208B, and a fourth STA 210B. The third wireless network 200C may have its own AP 202C and one or more STAs such as a first STA 204C, a second STA 206C, and a third STA 208C.

As described above, the probe request and probe response message exchange occurs in broadcast and unicast mode, respectively. A STA that sends a probe request message triggers probe response transmission by all the APs within the transmission range of the STA. As shown in FIG. 2, STAs from the second wireless network 200B and the third wireless network 200C may send broadcast probe request messages that are received by the AP 202A. The AP 202A may then send individual unicast probe response messages to the STAs in the second wireless network 200B and the third wireless network 200C. The probe response messages may be sent by the AP 202 using the basic rate. Since they are unicast, they may be repeatedly transmitted until the recipient STA acknowledges successful reception of the frame or the packet is dropped due to reaching retry count.

If there are many APs and STAs in the vicinity (e.g., in public spaces, office buildings, and multi dwelling units (MDUs)), then probe response frames originating from different APs may collide with each other. This may cause retransmissions and may contribute considerably to airtime overhead.

Figure 3:
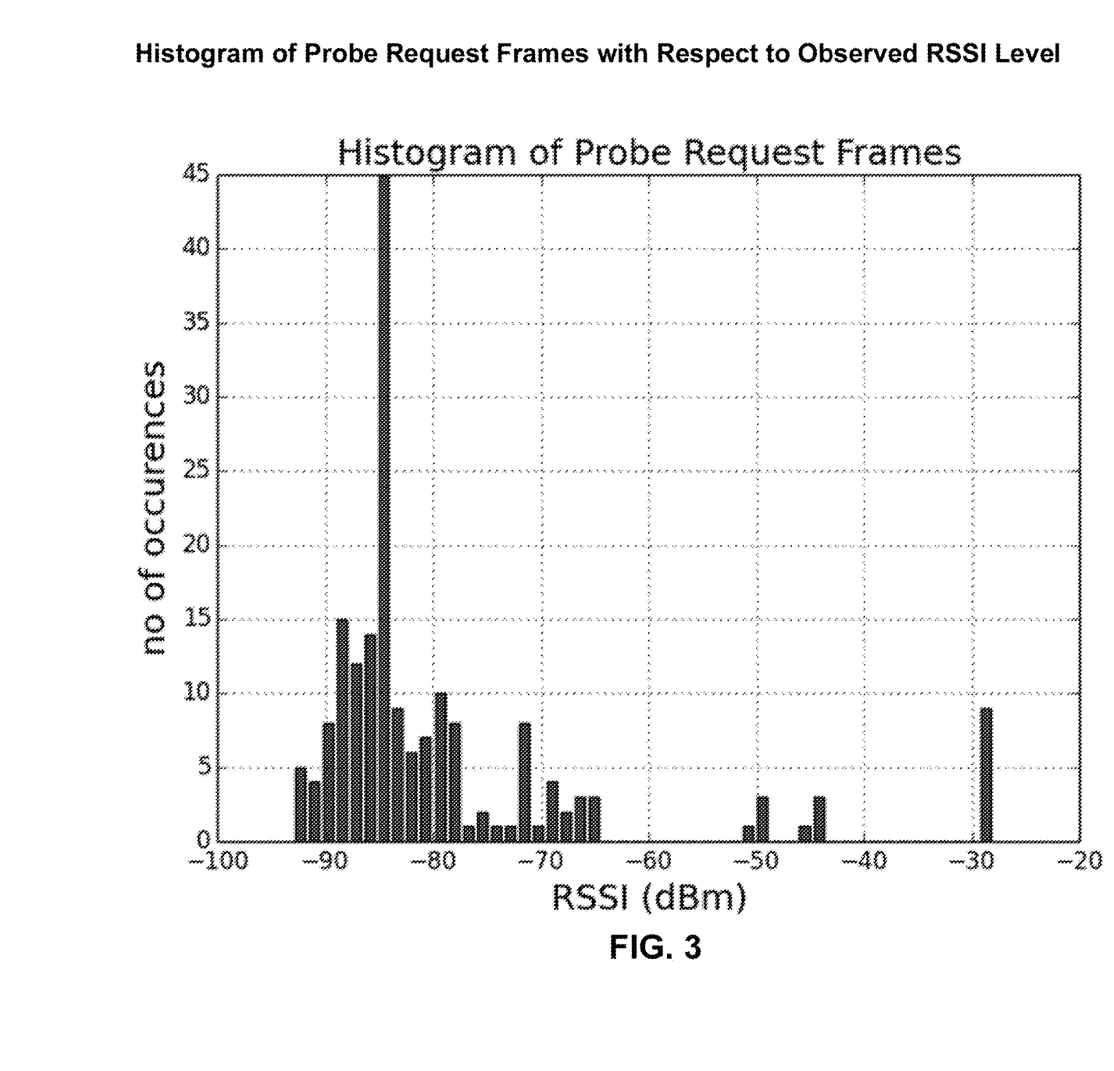
FIG. 3 is a histogram illustrating a number of probe requests with respect to observed received signal strength indicator (RSSI) levels.

Referring now to FIG. 3, a histogram illustrating a number of probe requests (y-axis) with respect to observed received signal strength indicator (RSSI) levels (x-axis) is shown. The information presented may be collected by a sniffer collocated with an AP in residential or public environment, such as the AP 202A of FIG. 2. As shown in FIG. 3, most of the probe requests received by the AP 202A may have very low RSSI levels (e.g., approximately −80 dBm to −90 dBm). These probe requests may be sent by STAs that belong to other networks, such as the second wireless network 200B and the third wireless network 200C. These STAs may not have any intention to associate with the AP 202A. This may be an expected result, as probe requests transmitted by STAs that belong to neighboring wireless networks may reach the AP 202A at very low signal levels.

It should be noted that setting the AP 202A, the AP 202B, and the AP 202C to different operating channels may not solve this problem, because the STAs from the second wireless network 200B and the third wireless network 200C may send probe request messages in all channels. Thus, even though the AP 202A, the AP 202B and the AP 202C may operate in different channels, the STAs that belong to the second wireless network 200B and the third wireless network 200C may send probe requests in the channels the AP 202A is operating in.

The examples described herein may mitigate or prevent responses from the AP 202A to these probe request messages.

Figure 4:
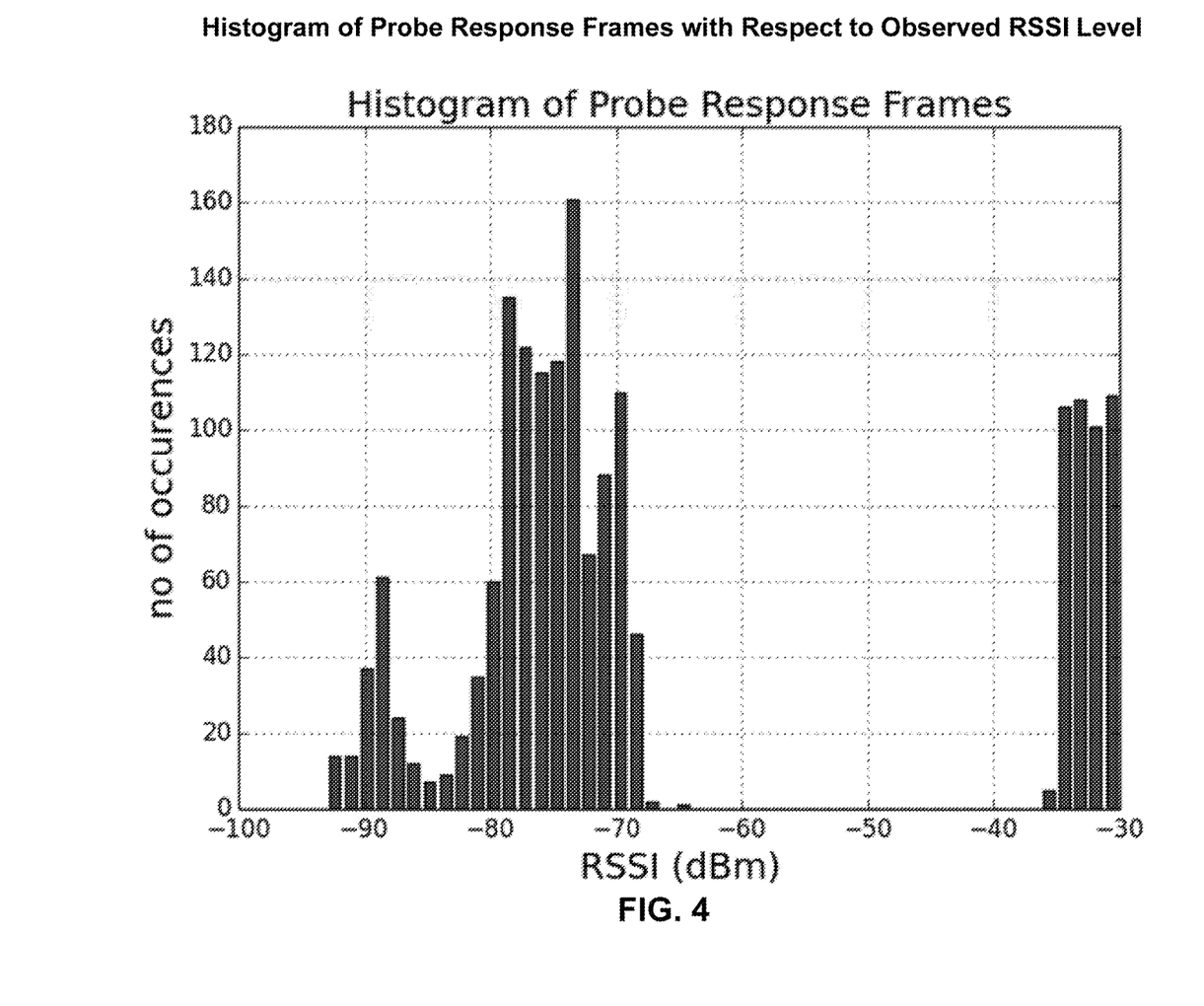
FIG. 4 is a histogram illustrating a number of probe response frames with respect to observed RSSI levels.

Referring now to FIG. 4, a histogram illustrating a number of probe response frames (y-axis) with respect to observed RSSI levels (x-axis) is shown. The information presented may be collected by a sniffer collocated with an AP in residential or public environment, such as the AP 202A of FIG. 2. It should be noted that there may be a significant difference in the number of probe requests (FIG. 3) and probe response frames (FIG. 4). The number of probe response frames (FIG. 4) may be almost an order of magnitude more than the number of probe request frames (FIG. 3).

The description herein includes methods by which the AP 102A may reduce the overhead caused by the probe request and probe response messaging. In one example, the methods may not require any modifications to STA devices. The overhead minimization (i.e., the improvement in performance) may be realized by modifying the AP 102A firmware.

Figure 5:
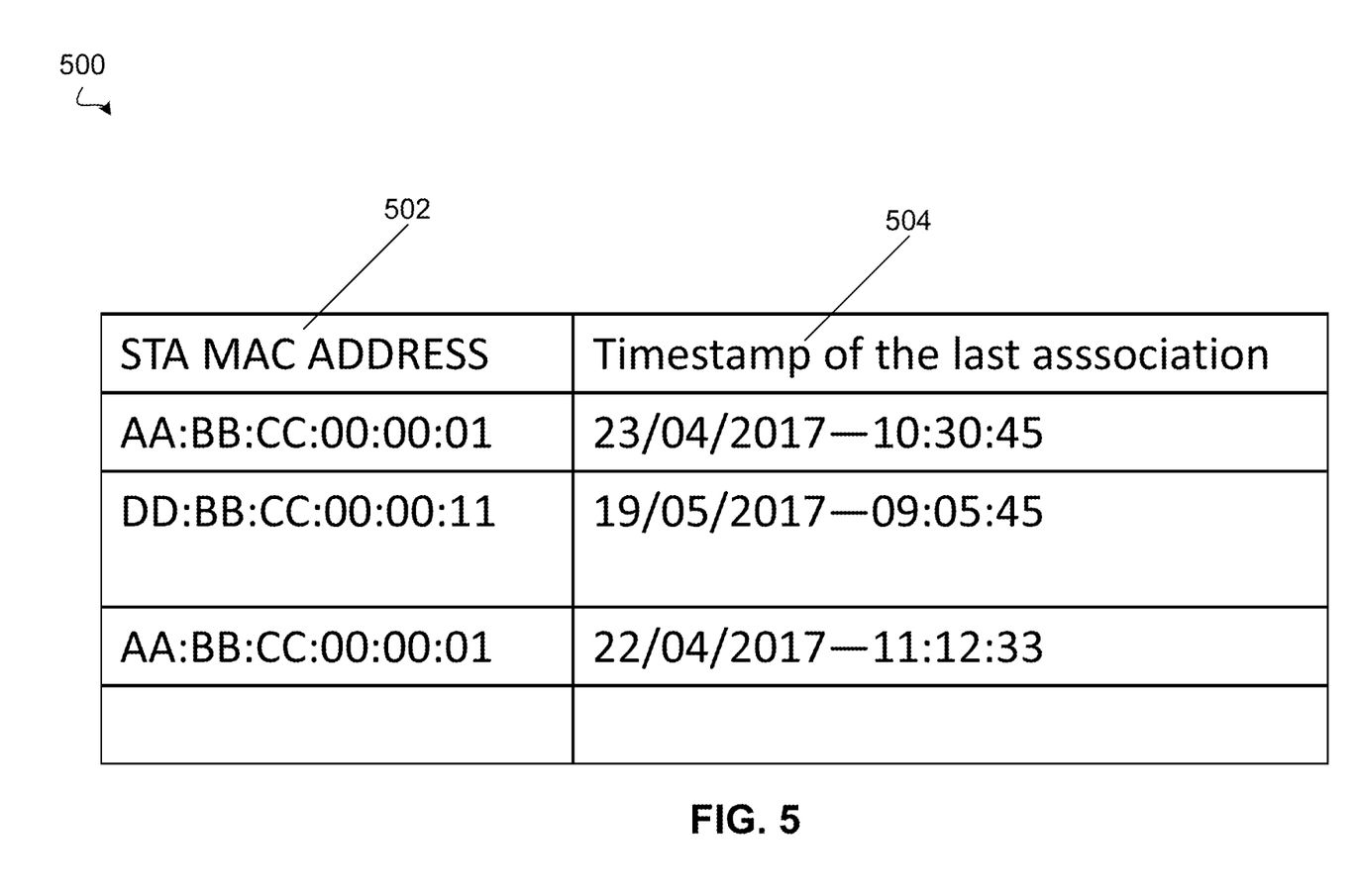
FIG. 5 is a diagram illustrating a STA information table.

Referring now to FIG. 5, a diagram illustrating a STA information table 500 is shown. The AP 202A may keep track of the clients (e.g., STAs) that have associated with it, in the STA information table 500. The STA information table 500 may be stored in one or more of the non-removable memory 130 and the removable memory 132 described above with reference to FIG. 1. The STA information table 500 may include first column 502 identifying STA MAC addresses and a second column 504 identifying a timestamp of last association. It should be noted that currently unassociated STAs, which have associated with the AP 202A at some time in the past, may also be stored in the STA information table 500. After a predetermined but configurable amount of time has passed since the last association of a STA, that STA may be removed from the list. In an example, this predetermined amount of time may be 7 days, but it may be set to be a longer or shorter time period in other implementations.

The AP 202A may determine the address of a STA from the probe request message and may not respond to probe requests sent by the STAs that are not listed in the STA information table if the measured signal strength (e.g., in terms of RSSI) falls below a predetermined but configurable RSSI threshold. In an example, the RSSI threshold may be approximately −70 dBm. The RSSI threshold may vary depending on a transmitting STA's physical layer capabilities, which may be specified in the probe request message. For example, if a STA is using the IEEE 802.11g protocol, the RSSI threshold may be −70 dBm. If a STA is using the IEEE 802.11ac protocol, the RSSI threshold may be −75 dBm. The RSSI threshold may be set lower or higher than this value in other implementations.

The AP 202A may be allowed to respond to probe request messages sent by STAs that are listed in the STA information table, regardless of the RSSI of the received probe request. This way, a STA belonging to the first wireless network 200 may initiate association from far corners of the first wireless network 200. In this example, a STA that is new to the first wireless network 200 that is to be associated with the AP 202A may be brought relatively close, depending on the RSSI threshold used for preventing probe response transmission to the AP 202. This may ensure that the STA may receive a response to its probe request message.

It should be noted that not all STAs may depend on probe request and probe response message exchange to initiate association. For example, STAs may make use of passive scanning of beacon frames transmitted by the AP 202A to learn of its supported capabilities and to initiate association.

Applying these methods to the deployment scenario illustrated in FIG. 2, the AP 202A may only respond to probe request messages sent by the STAs in the first wireless network 200A, the AP 202B may only respond to probe request messages sent by the STAs in the second wireless network 200B, and the AP 202C would only respond to the probe request messages sent by STAs in the third wireless network 200C. The airtime overhead due to the probe request and probe response exchange may be significantly reduced.

If only the AP 202A employs the above method, but the AP 202B and the AP 202C do not employ the method, then only the AP 202A may stop sending probe responses to the STAs that belong to the other wireless networks 200B and 200C. The AP 202B and the AP 202C may still continue responding to probe requests sent by the STAs that belong to the first wireless network 200A. In order to minimize the probe response overhead caused by the neighboring legacy networks, the AP 202A may adjust its operating channel such that it does not overlap with the operating channels of neighboring APs. For example, if the AP 202B is operating in channel 1, and the AP 202C is operating in channel 11, then the AP 202A may operate in channel 6. Accordingly, the AP 202A may avoid probe responses sent by the AP 202B and the AP 202C. In an example, the AP 202A may choose its operation channel by making use of a channel selection scheme that takes into account the interference caused by the other networks in the vicinity. Examples of this scheme may be found in in U.S. patent application Ser. No. 14/186,690 and PCT Application Serial No. PCT/EP2015/079673, the contents of which are hereby incorporated by reference. Moreover, the AP 202A may keep track of its neighbor wireless networks by carrying out periodic off-channel scans, and it may identify the channels in which its close neighbors are operating.

Figure 6:
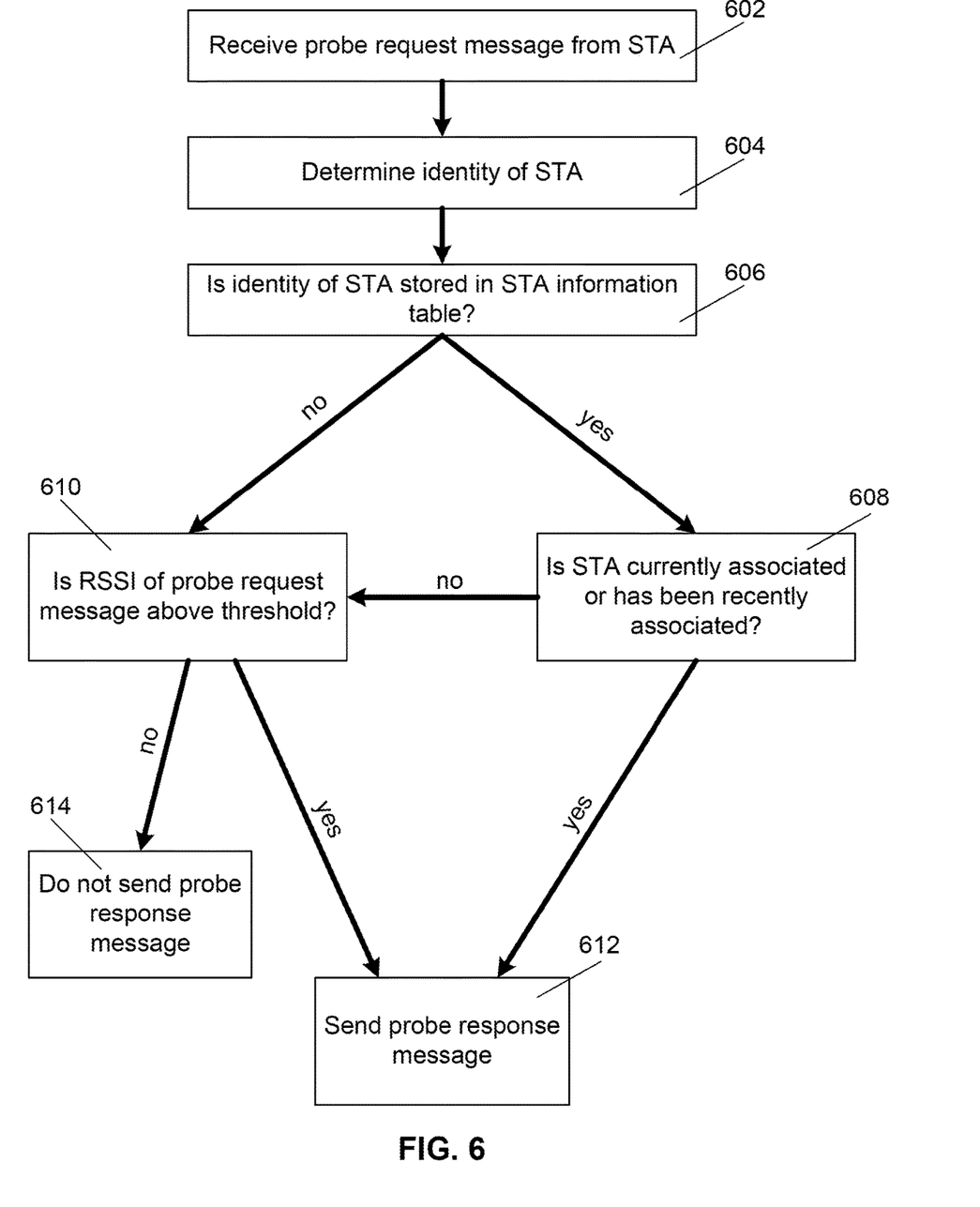
FIG. 6 is a flowchart illustrating a method of reducing overhead in a probe request and probe response message exchange.

Referring now to FIG. 6, a flowchart illustrating a method of reducing overhead in the probe request and probe response message exchange is shown. In step 602, the AP 202A may receive a probe request message from a STA. In step 604, the AP 202A may determine the identity of the STA using the probe request message. In step 606, the AP 202A may determine if the identity of the STA is stored in the STA information table 500. If yes, the method proceeds to step 608. If no, the method proceeds to step 610.

In step 608, the AP 202A may determine if the STA is currently associated with the AP 202A or has been recently associated with the AP 202A within a predetermined time. If yes, the method proceeds to step 612. If no, the method proceeds to step 610.

In step 610, the AP 202A may determine if the RSSI of the probe request message is above the predetermined threshold. If no, the method proceeds to step 614 and the AP 202A does not send a probe response message. If yes, the method proceeds to step 612 and the AP 202A sends a probe response message to the STA.

Figure 7:
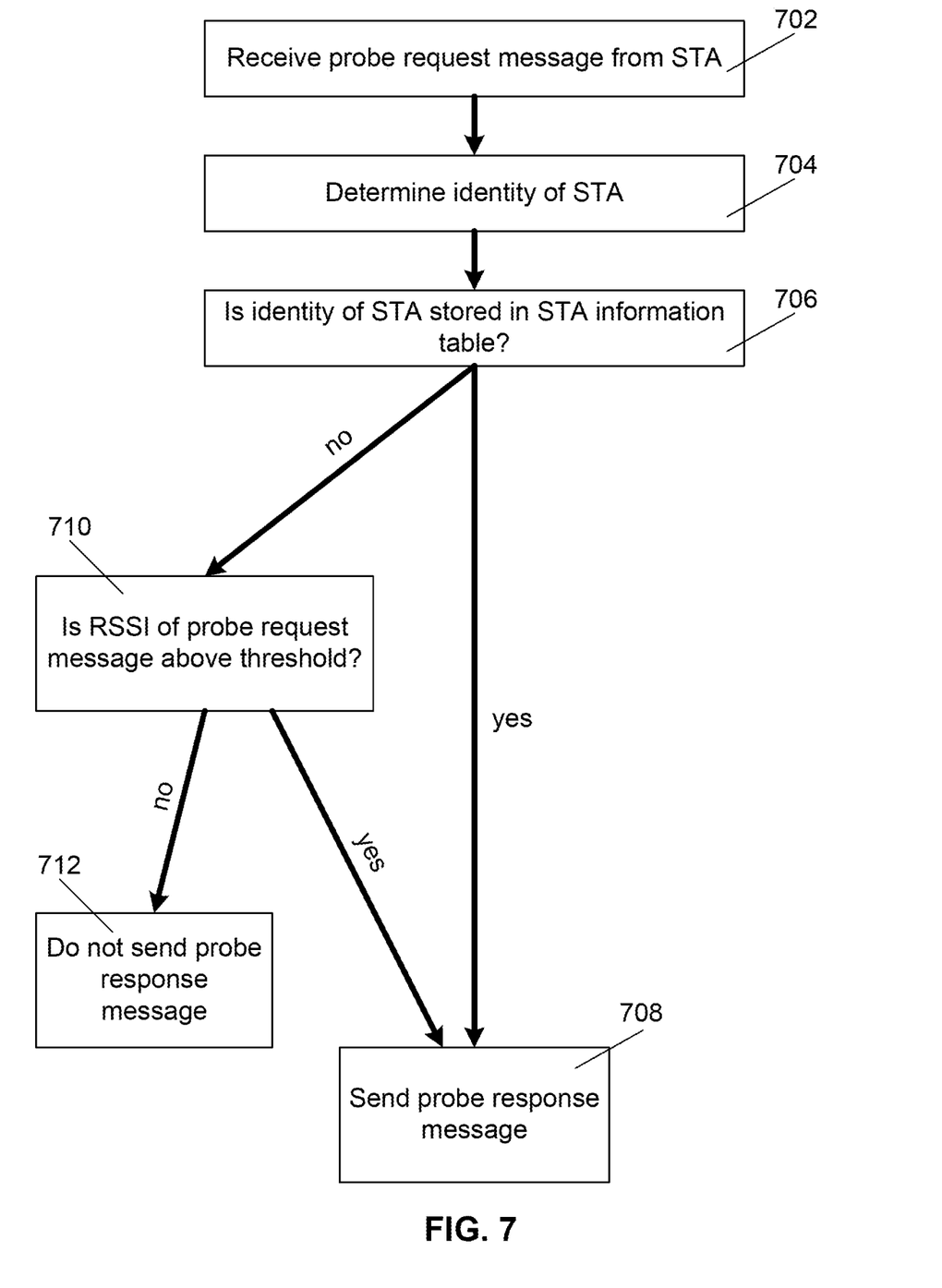
FIG. 7 is a flowchart illustrating another method of reducing overhead in the probe request and probe response message exchange.

Referring now to FIG. 7, a flowchart illustrating another method of reducing overhead in the probe request and probe response message exchange is shown. In step 702, the AP 202A may receive a probe request message from a STA. In step 704, the AP 202A may determine the identity of the STA using the probe request message. In step 706, the AP 202A may determine if the identity of the STA is stored in the STA information table 500. If yes, the method proceeds to step 708. If no, the method proceeds to step 710.

In step 710, the AP 202A may determine if the RSSI of the probe request message is above the predetermined threshold. If no, the method proceeds to step 714 and the AP 202A does not send a probe response message. If yes, the method proceeds to step 712 and the AP 202A sends a probe response message to the STA.

Figure 8:
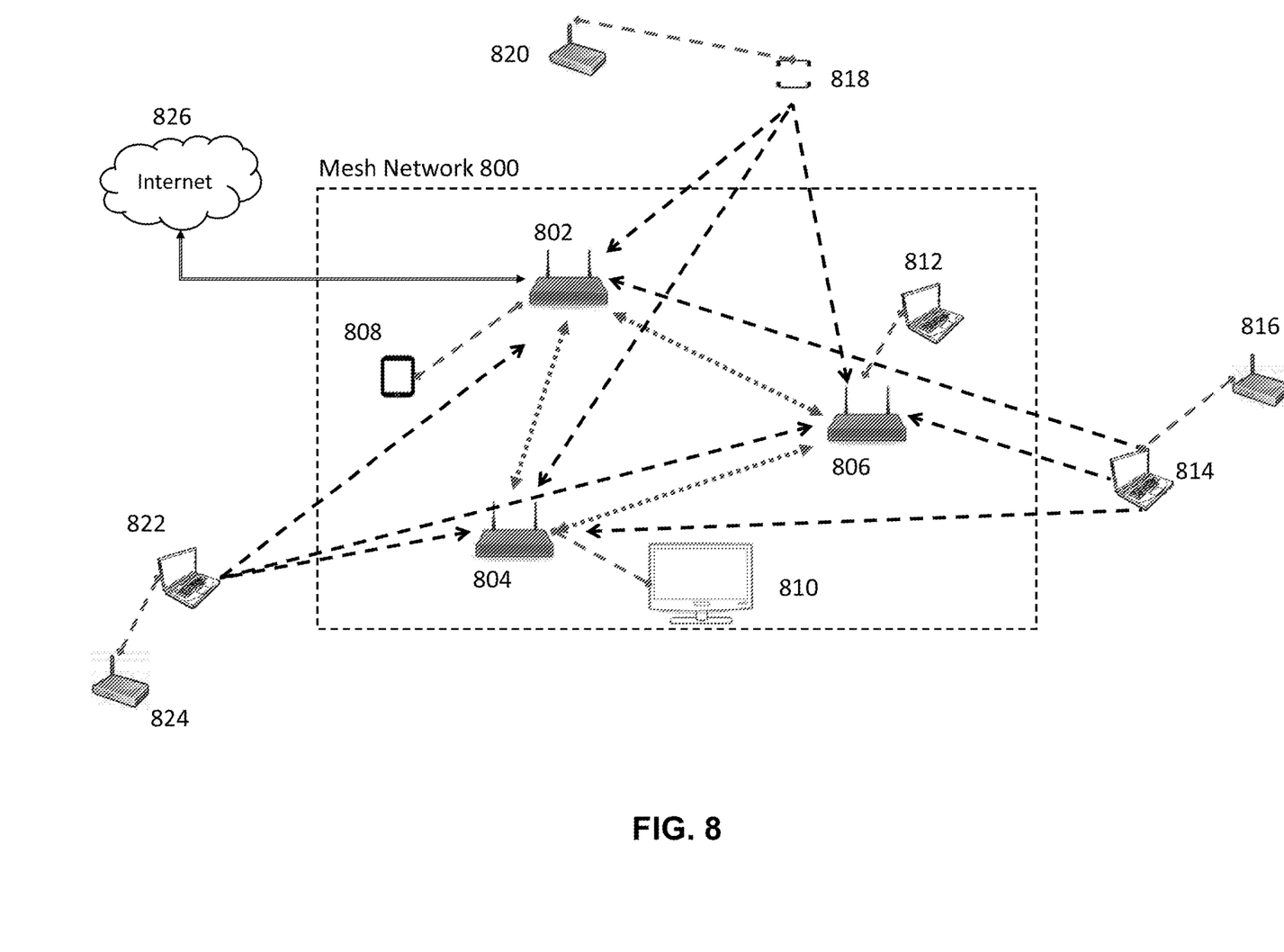
FIG. 8 is a diagram illustrating a wireless mesh network.

Referring now to FIG. 8, a diagram illustrating a wireless mesh network 800 is shown. Mesh networks may also be affected significantly by management frame overhead. The mesh network 800 may include one or more mesh APs and one or more STAs. For example, the mesh network 800 may include a first AP 802, a second AP 804, and a third AP 806. The first AP 802 may be connected to the Internet 826. The mesh network 800 may also include a first STA 808, a second STA 810, and a third STA 812. The first AP 802, the second AP 804, and the third AP 806 may be subject to probe request messages sent from STAs that belong to other networks in the vicinity of the mesh network 800. For example, broadcast probe request messages sent by a fourth STA 814 associated with a fourth AP 816, a fifth STA 818 associated with a fifth AP 820, and/or a sixth STA 822 associated with a sixth AP 824 may be received by the APs in the mesh network 800. As described above, the APs in the mesh network 800 may not respond to these probe request messages unless the probe request message is received with an RSSI level above a determined threshold.

The APs in the mesh network 800 may each have a Station Information Table 400 as described above. These APs may exchange their Station Information Tables 400 so that each AP in the mesh network 800 has the same set of information about which STAs belong to the network and their last association time.

In an example, the APs in the mesh network 800 may be equipped with client steering functionality as disclosed in PCT Patent Application Serial No. PCT/EP2015/064163, U.S. patent application Ser. No. 14/747,438, and PCT Patent Application Serial No. PCT/EP2015/079673, the contents of which are hereby incorporated by reference. When equipped with client steering functionality, only one AP in the mesh network 800 may respond to probe request messages sent by a STA. The other APs in the mesh network 800 may not respond to probe request messages irrespective of the RSSI level of the probe request frame. The responding AP may be determined by client steering logic implemented in the client steering functionality. For example, if the first STA 808 is being steered to the second AP 804 while it is connected to the first AP 802, only the second AP 804 may respond to probe request messages from the first STA 808. The first AP 802 and the third AP 806 may not respond. If a STA is not being steered to any other AP, then the associated AP may respond to probe requests sent by the STA.

Another type of management frames that may cause significant airtime overhead are periodic beacon frames sent by APs. These beacon frames may be used for the announcement of an AP's capabilities to other nodes, sleep-awake scheduling in power save mode, channel switch synchronization (e.g., in Channel Switch Announcement (CSA) and Extended-CSA standards), and other functions that require time synchronization among the nodes in the network.

Since the mesh network 800 employs more than one mesh AP, each may transmit its own beacon frames. For example, if each AP in the mesh network 800 sends beacon messages every 100 ms, it makes 10 beacon frame transmissions per second. If there are three APs in the mesh network, then the network may transmit 30 beacon frames per second. Beacon messages may be broadcast using the basic rate. The amount of airtime overhead due to beacon frame transmission may become significant as the number of nodes in the same vicinity increases.

In order to reduce the airtime overhead caused by beacon frame transmissions, the APs in the mesh network 800 may employ a beacon period adjustment. If there are no STAs associated with an AP in the mesh network 800, for example the first AP 802, the first AP 802 may increase the beacon transmission period. In other words, the first AP 802 may send beacon frames less frequently. This may be achieved by adjusting the target beacon transmission time (TBTT) parameter.

However, if there are STAs associated with the first AP 802, the first AP 802 may adjust its beacon frame period by considering the minimum timing synchronization required by the associated STAs and the connected APs. The first AP 802 may go back to a default beacon frame period if it has an associated STA. In an example, the default beacon period may be approximately 100 ms. If the first AP 802 does not have any connected STAs, it may increase its beacon frame period to 500 ms. The other APs in the mesh network 800 may use a beacon period of approximately 100 ms if they have associated STAs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a STA, AP, or any host computer.

What is claimed is:

1. An access point (AP) comprising:
a memory;
a transceiver; and
a processor operatively coupled to the transceiver and the memory;
the transceiver and the processor configured to receive a first signal, the first signal comprising a probe request message from a station (STA), wherein the probe request message comprises a medium access control, MAC, address of the STA;
the transceiver and the processor configured to store a STA information table in a memory of the AP, wherein the STA information table comprises a set of STAs, wherein each STA from the set of STAs are either currently associated with the AP or were previously associated with the AP, wherein the STA information table includes a last association timestamp and MAC address for each STA of the set of STAs;
the transceiver and the processor configured to remove any STA from the set of STAs who's last association timestamp is greater than a predetermined time threshold to generate an updated STA information table;
the transceiver and the processor configured to generate a probe response on a condition that a received signal strength indicator (RSSI) of the first signal is above a predetermined threshold or that the STA is on the updated STA information table based on looking up the MAC address of the STA on the updated STA information table, wherein the predetermined RSSI threshold is based on the physical layer capabilities of the STA; and
the transceiver and the processor configured to transmit a second signal to the STA, the second signal comprising the probe response message.

2. The AP of claim 1, wherein the STA is located within a wireless network associated with the AP.

3. The AP of claim 1, wherein the STA is located within a separate wireless network from a wireless network associated with the AP.

4. The AP of claim 1, wherein the first signal is a broadcast message comprising a request for information about the AP.

5. The AP of claim 1, further comprising changing an operating channel of the AP from a first channel to a second channel based on a condition that a neighboring AP is using the first channel and is not configured to maintain the STA information table.

6. The AP of claim 1, wherein the AP is part of a mesh network of APs, and wherein the updated STA information table is synchronized with all APs of the mesh network.

7. The AP of claim 1, wherein the probe response message comprises one or more of channel capabilities of the AP, supported IEEE 802.11 protocols, supported bandwidths, and a supported number of spatial streams.

8. The AP of claim 1, wherein the predetermined threshold is −70 dBm.

9. The AP of claim 1, wherein the second signal is a unicast message.

10. A method implemented by an access point (AP), the method comprising:
receiving a first signal from a station (STA), the first signal comprising a probe request message that includes medium access control, MAC, address of the STA;
storing a STA information table in a memory of the AP, wherein the STA information table comprises a set of STAs, wherein each STA from the set of STAs are either currently associated with the AP or were previously associated with the AP, wherein the STA information table includes a last association timestamp and MAC address for each STA of the set of STAs;
removing any STA from the set of STAs who's last association timestamp is greater than a predetermined time threshold to generate an updated STA information table;
generating a probe response message on a condition that a received signal strength indicator (RSSI) of the first signal is above a predetermined RSSI threshold or that the STA is on the updated STA information table based on looking up the MAC address of the STA on the updated STA information table, wherein the predetermined RSSI threshold is based on the physical layer capabilities of the STA; and
transmitting a second signal to the STA, the second signal comprising the probe response message.

11. The method of claim 10, wherein the STA is located within a wireless network associated with the AP.

12. The method of claim 10, wherein the STA is located within a separate wireless network from a wireless network associated with the AP.

13. The method of claim 10, wherein the first signal is a broadcast message comprising a request for information about the AP.

14. The method of claim 10, further comprising changing an operating channel of the AP from a first channel to a second channel based on a condition that a neighboring AP is using the first channel and is not configured to maintain the STA information table.

15. The method of claim 10, wherein the AP is part of a mesh network of APs, and wherein the updated STA information table is synchronized with all APs of the mesh network.

16. The method of claim 10, wherein the probe response message comprises one or more of channel capabilities of the AP, supported IEEE 802.11 protocols, supported bandwidths, and a supported number of spatial streams.

17. The method of claim 10, wherein the predetermined threshold is approximately −70 dBm.

18. The method of claim 10, wherein the second signal is a unicast message.

* * * * *